(12) United States Patent
Schantz

(10) Patent No.: US 6,593,886 B2
(45) Date of Patent: Jul. 15, 2003

(54) PLANAR LOOP ANTENNA

(75) Inventor: Hans Gregory Schantz, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 60 days.

(21) Appl. No.: 09/753,243

(22) Filed: Jan. 2, 2001

(65) Prior Publication Data

US 2002/0126058 A1 Sep. 12, 2002

(51) Int. Cl.[7] .......................... H01Q 1/38; H01Q 11/12
(52) U.S. Cl. ................ 343/700 MS; 343/741; 343/866
(58) Field of Search ................ 343/700 MS, 702, 343/741, 742, 795, 866, 867, 821; 455/89, 90

(56) References Cited

U.S. PATENT DOCUMENTS

| | | | | |
|---|---|---|---|---|
| 3,025,524 A | * | 3/1962 | Thies | 343/741 |
| 4,641,317 A | | 2/1987 | Fullerton | 375/1 |
| 4,743,906 A | | 5/1988 | Fullerton | 342/27 |
| 4,813,057 A | | 3/1989 | Fullerton | 375/37 |
| 4,979,186 A | | 12/1990 | Fullerton | 375/23 |
| 5,363,108 A | | 11/1994 | Fullerton | 342/27 |
| 5,677,927 A | | 10/1997 | Fullerton et al. | 375/200 |
| 5,687,169 A | | 11/1997 | Fullerton | 370/324 |
| 5,714,965 A | * | 2/1998 | Taguchi | 343/866 |
| 5,832,035 A | | 11/1998 | Fullerton | 375/210 |
| 6,236,368 B1 | * | 5/2001 | Johson | 343/702 |
| 6,243,045 B1 | * | 6/2001 | Ishibashi | 343/741 |

* cited by examiner

Primary Examiner—Tan Ho
(74) Attorney, Agent, or Firm—Law Office of Donald D. Mondul

(57) ABSTRACT

An apparatus for conveying electromagnetic energy intermediate a host device and a medium substantially adjacent to the apparatus includes: (a) a transceiver for transmitting the energy to and receiving the energy from the medium; (b) a transmission structure for conveying signals to or from the host device; and (c) a feed structure coupling the transceiver with the transmission structure. The transceiver includes a planar metal layer arrayed upon a dielectric substrate. The metal layer is bounded by a first edge and a second edge. The first and second edges cooperate to form a bight having a first and a second arm establishing a metal-free area intermediate the first and second arms. The first arm presents a first terminal locus and the second arm presents a second terminal locus. The feed structure is coupled with the first and second terminal loci to effect the coupling.

9 Claims, 14 Drawing Sheets

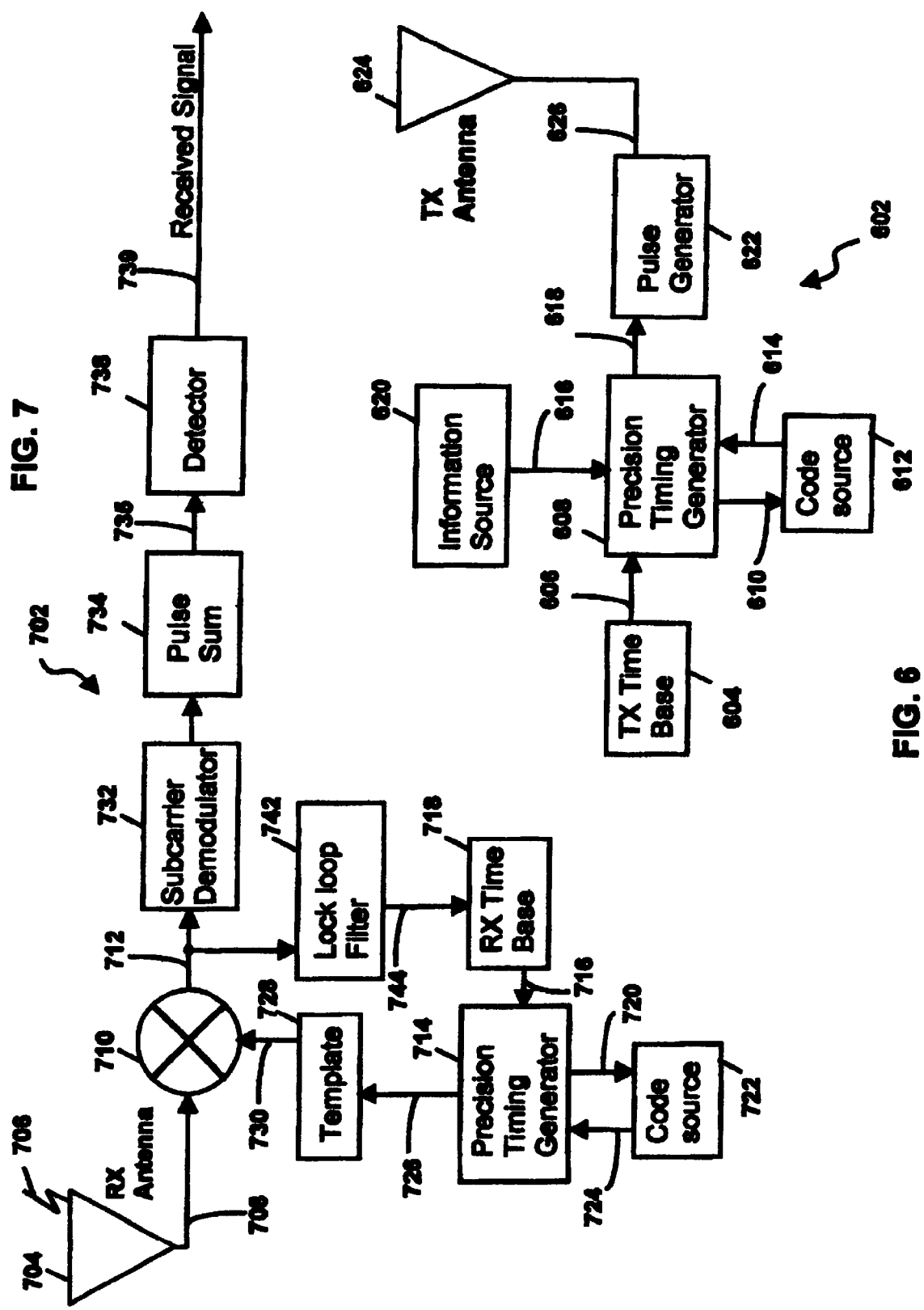

Corresponding to each Δt

PLANAR LOOP ANTENNA

BACKGROUND OF THE INVENTION

1. Field of the Invention

The present invention relates generally to radio communication effected using impulse radio. The present invention provides a planar loop antenna that is well-suited for use with impulse radio communications. In particular, the present invention provides an antenna that is useful with wireless local area network (LAN) systems including laptop computer or other portable communication devices. The antenna of the present invention is especially useful with PCMCIA (Personal Computer Memory Card International Association) card implementations of wireless modem devices for use with portable communication devices, such as lap top computers. There is a need for compact antennas having a radiation pattern similar to a loop antenna. In particular there is a need for such an antenna that is useful for broadband communications. It would be especially useful for such a loop-type antenna to handle impulse radio communications in an ultra wideband environment.

2. Related art

Recent advances in communications technology have enabled an emerging, revolutionary ultra wideband technology (UWB) called impulse radio communications systems (hereinafter called impulse radio).

Impulse radio was first fully described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents include U.S. Pat. Nos. 5,677,927 (issued Oct. 14, 1997) to Fullerton et al; and 5,687,169 (issued Nov. 11, 1997) and 5,832,035 (issued Nov. 3, 1998) to Fullerton. These patent documents are incorporated herein by reference.

Uses of impulse radio systems are described in U.S. patent application Ser. No. 09/332,502, entitled, "*System and Method for Intrusion Detection Using a Time Domain Radar Array,*" and U.S. patent. application Ser. No. 09/332,503, entitled, "*Wide Area Time Domain Radar Array,*" both filed the same day as the present application, Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

SUMMARY OF THE INVENTION

An apparatus for conveying electromagnetic energy intermediate a host device and a medium substantially adjacent to the apparatus includes: (a) a transceiving structure for transmitting the energy to the medium and receiving the energy from the medium; (b) a transmission structure for conveying signals representing the energy to the host device or from the host device; and (c) a feed structure coupling the transceiving structure with the transmission structure. The transceiving structure includes a substantially planar metal layer arrayed upon a dielectric substrate. The metal layer is bounded by a first edge and a second edge. The first edge and the second edge cooperate to form a bight having a first arm and a second arm establishing a metal-free area intermediate the first arm and the second arm. The first arm presents a first terminal locus and the second arm presents a second terminal locus. The feed structure is coupled with the first and second terminal loci to effect the coupling.

It is an object of the present invention to provide an antenna that is useful with wireless local area network (LAN) systems including laptop computer or other portable communication devices.

It is a further object of the present invention to provide an antenna that is useful with PCMCIA card implementations of wireless modem devices for use with portable communication devices, such as lap top computers.

A further object of the present invention is to provide an antenna that is compact and has a radiation pattern similar to a loop antenna.

Still a further object of the present invention is to provide an antenna that is useful for broadband or multi-band operation.

Another object of the present invention is to provide an antenna that is a loop-type antenna capable of handling impulse radio communications in an ultra wideband environment.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 6 illustrates a representative impulse radio transmitter functional diagram.

FIG. 7 illustrates a representative impulse radio receiver functional diagram.

DETAILED DESCRIPTION OF THE EMBODIMENTS

Over View of The Invention

Figure 1B:
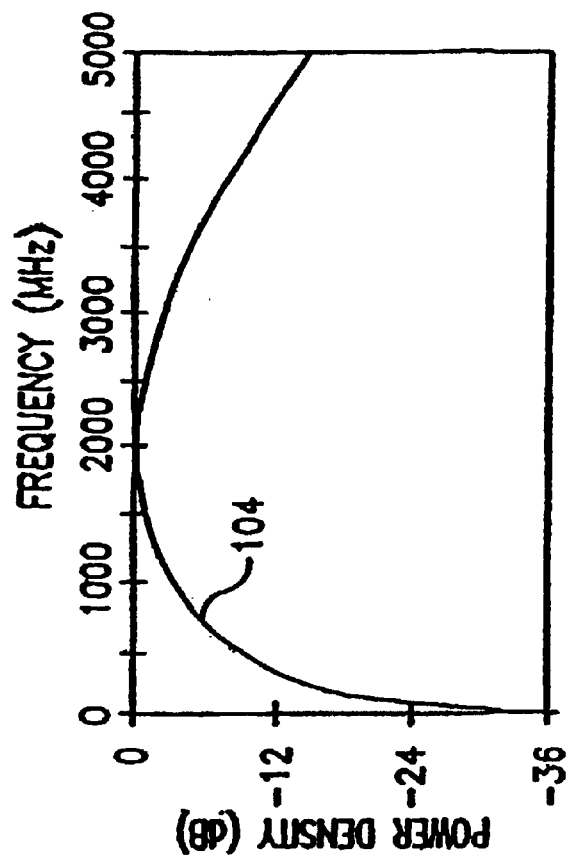
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1A:
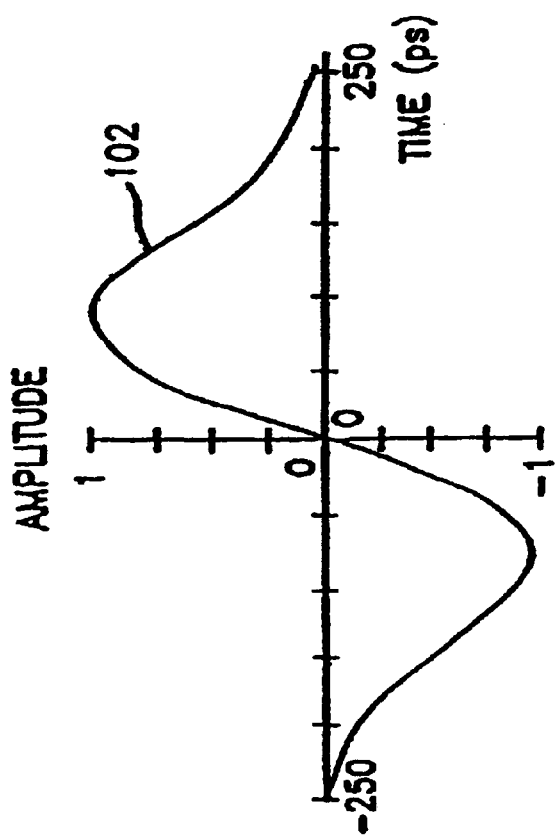
FIG. 1A illustrates a representative Gaussian Monocycle waveform in the time domain.

The frequency domain spectrum of the above waveform is shown in FIG. 1B. The corresponding equation is:

$$F_{mono}(f)=(2\pi)^{3/2}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
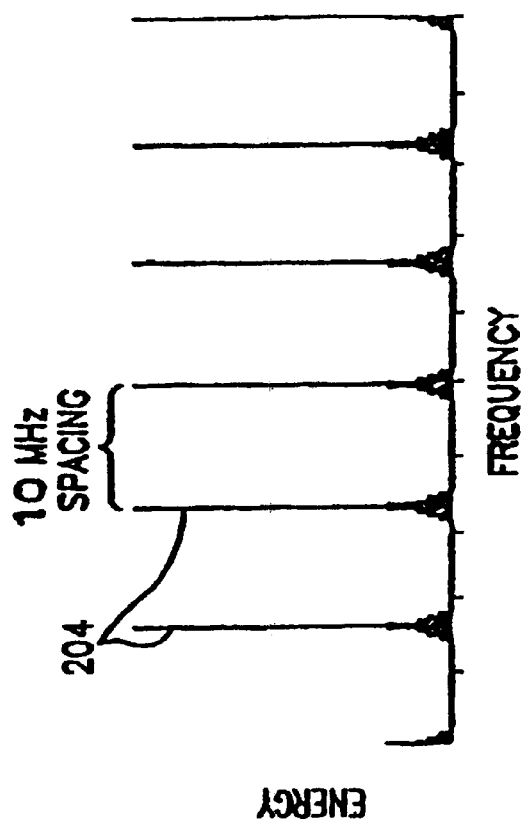
FIG. 2B illustrates the frequency domain amplitude of the waveform of FIG. 2A.
Figure 2A:
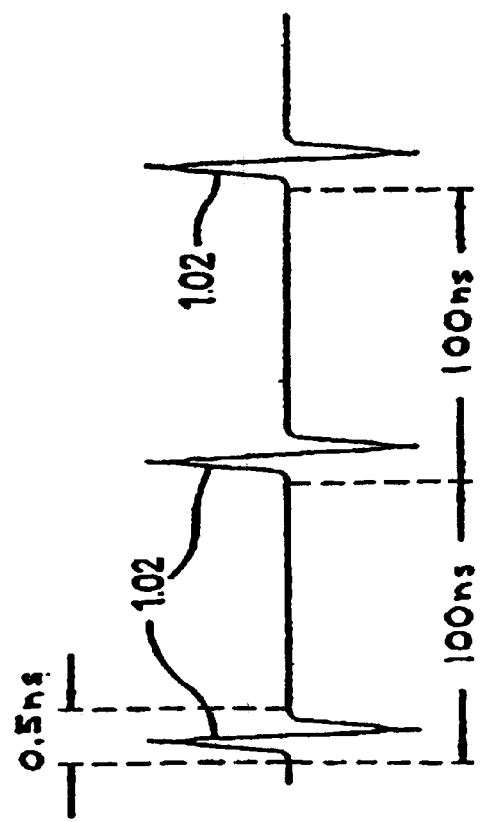
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
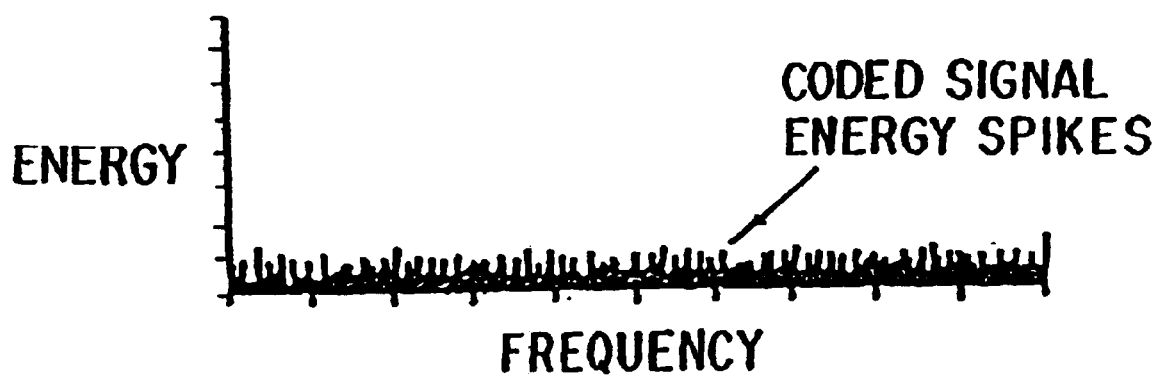
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
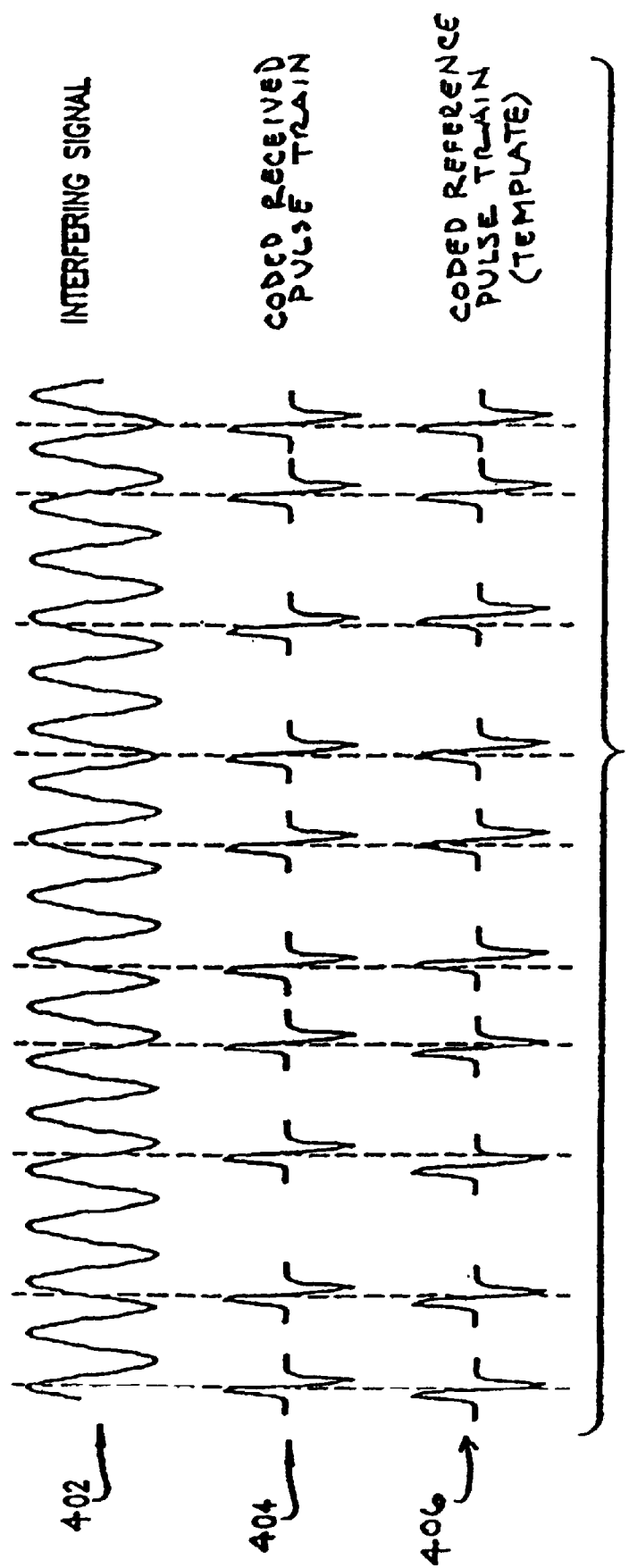
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain Impulse radio is resistant to interference because of its large processing gain. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V^2_{tot} = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Figure 5A:
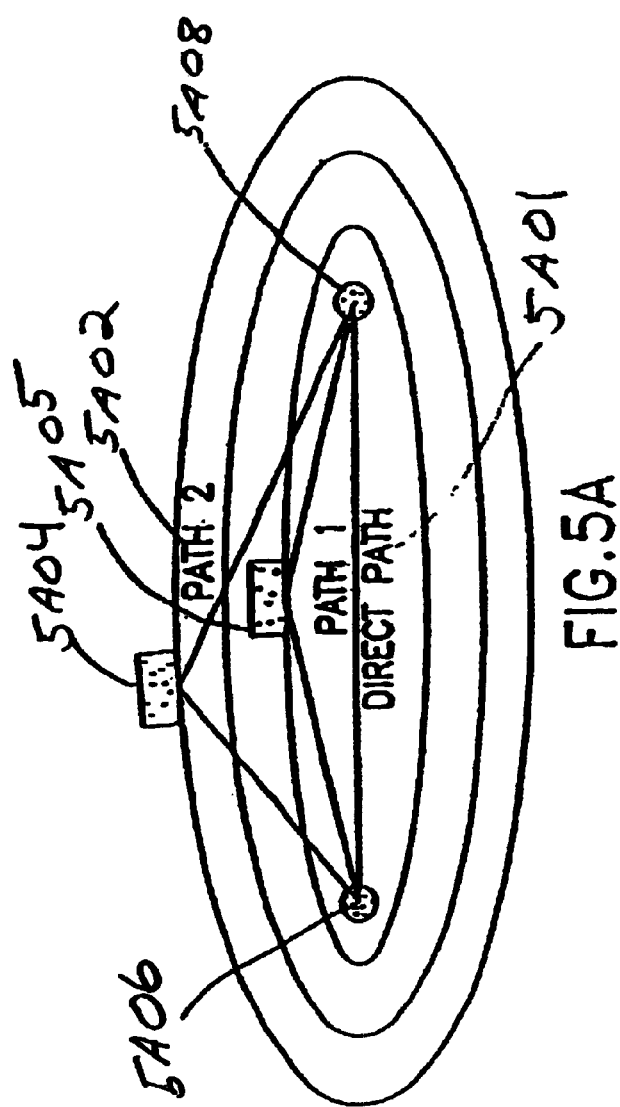
FIG. 5A illustrates a typical geometrical configuration giving rise to multipath received signals.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
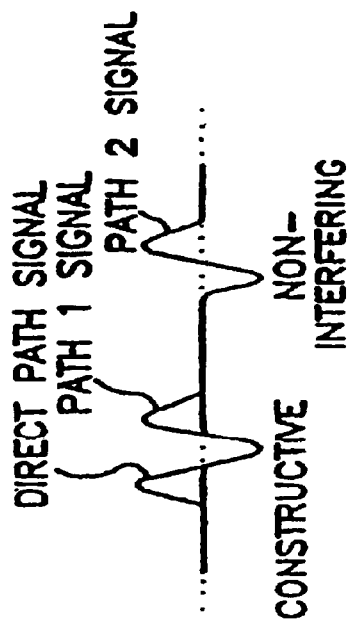
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
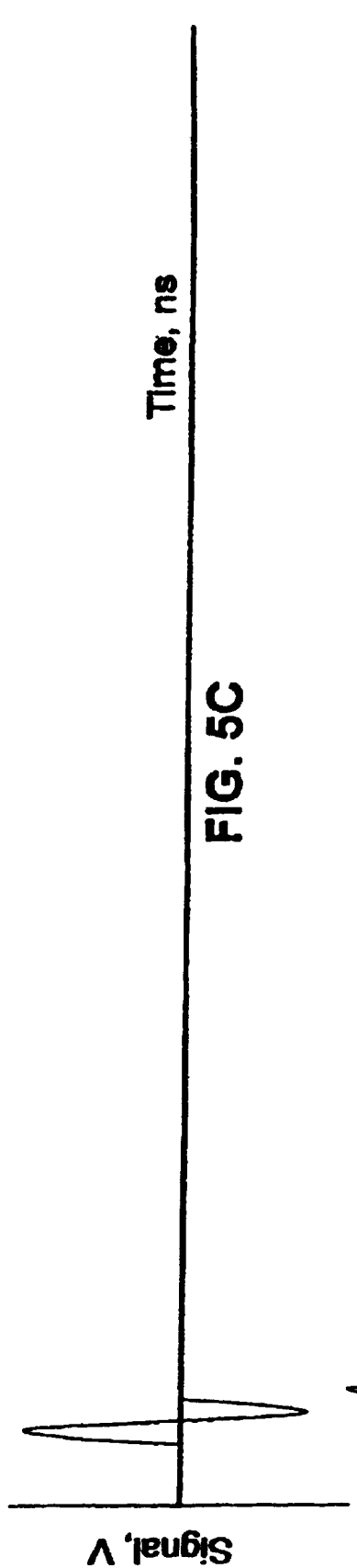
FIGS. 5C–5E illustrate a signal plot of various multipath environments.
Figure 5D:
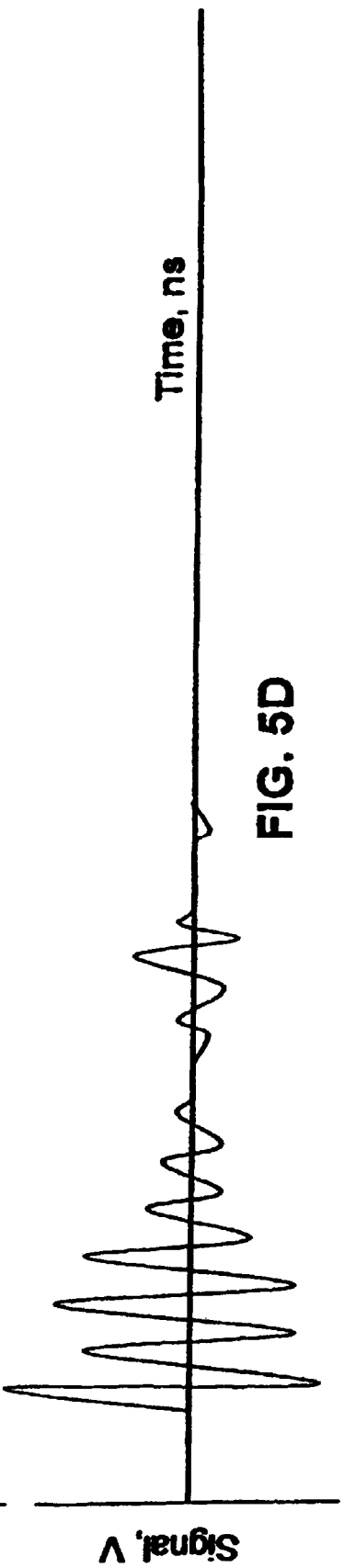
Figure 5E:
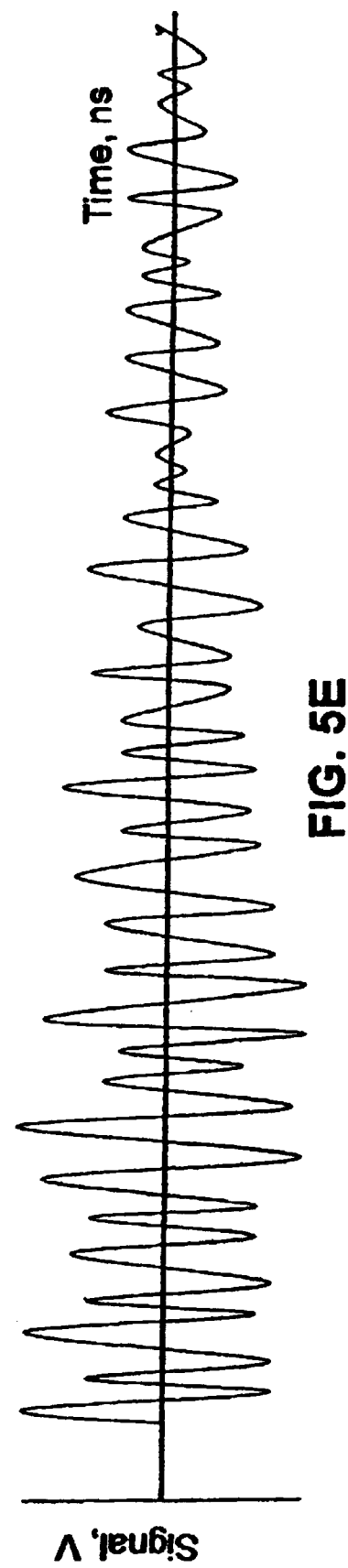

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from comer to comer in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sqrt{2}\sigma^2$ is the RMS amplitude of the combined multipath signals.

Figure 5F:
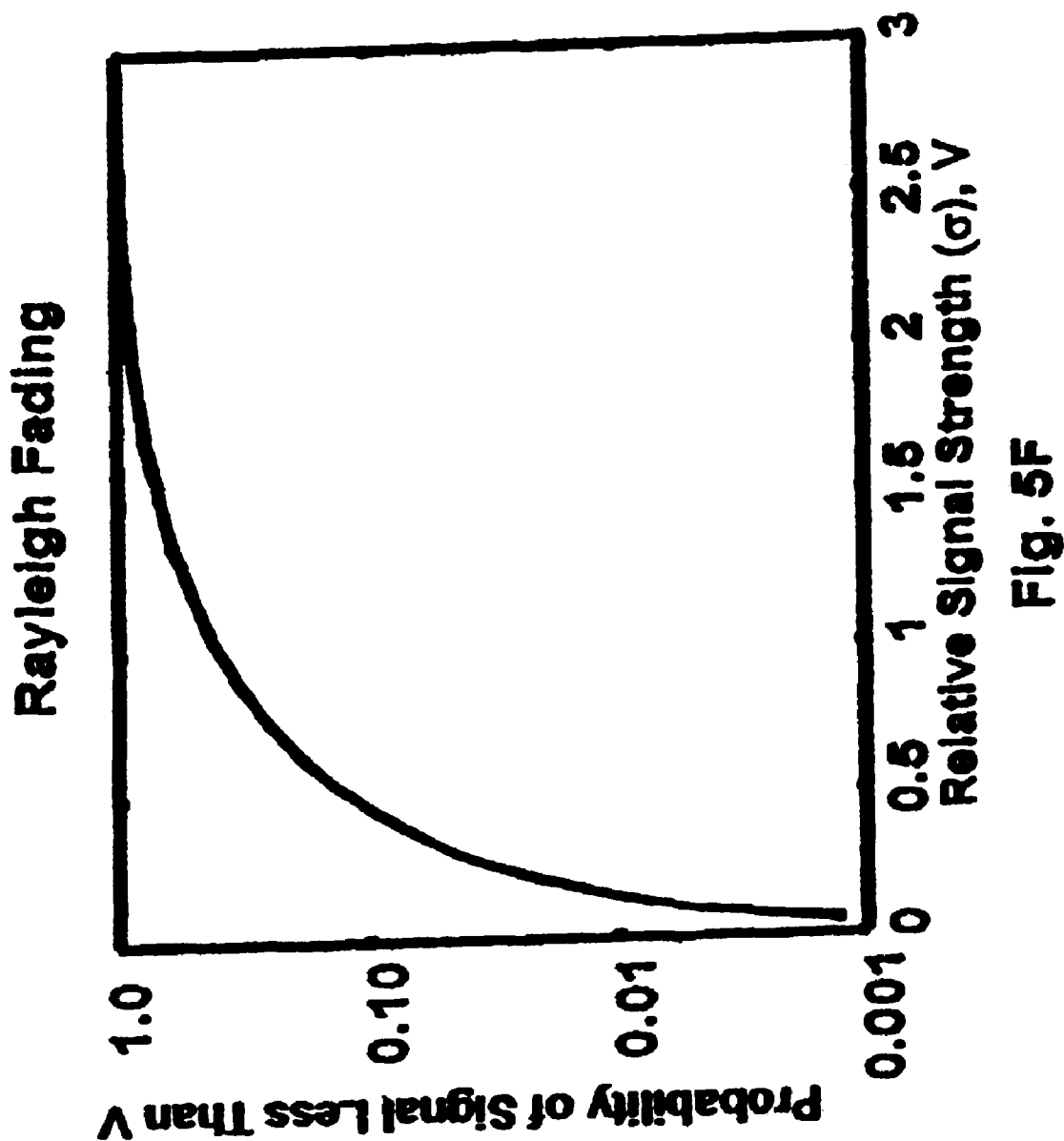
FIGS. 5F illustrates the Rayleigh fading curve associated with non-impulse radio transmissions in a multipath environment.

This distribution shown in FIG. 5F. It can be seen in FIG. 5F that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
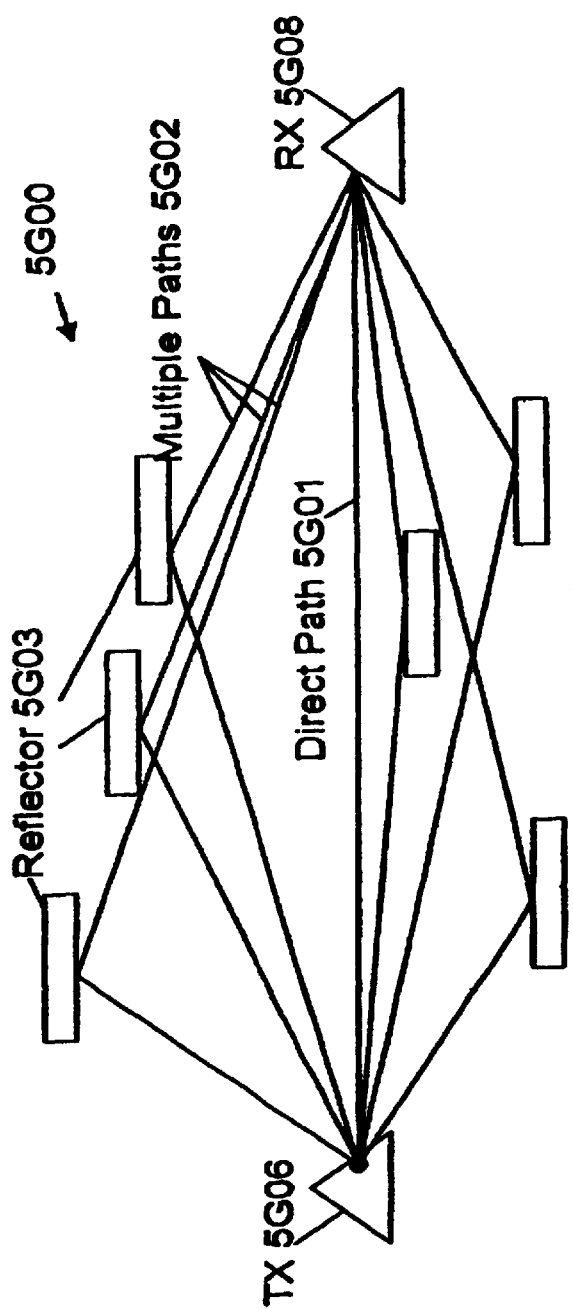
FIG. 5G illustrates a plurality of multipaths with a plurality of reflectors from a transmitter to a receiver.
Figure 5H:
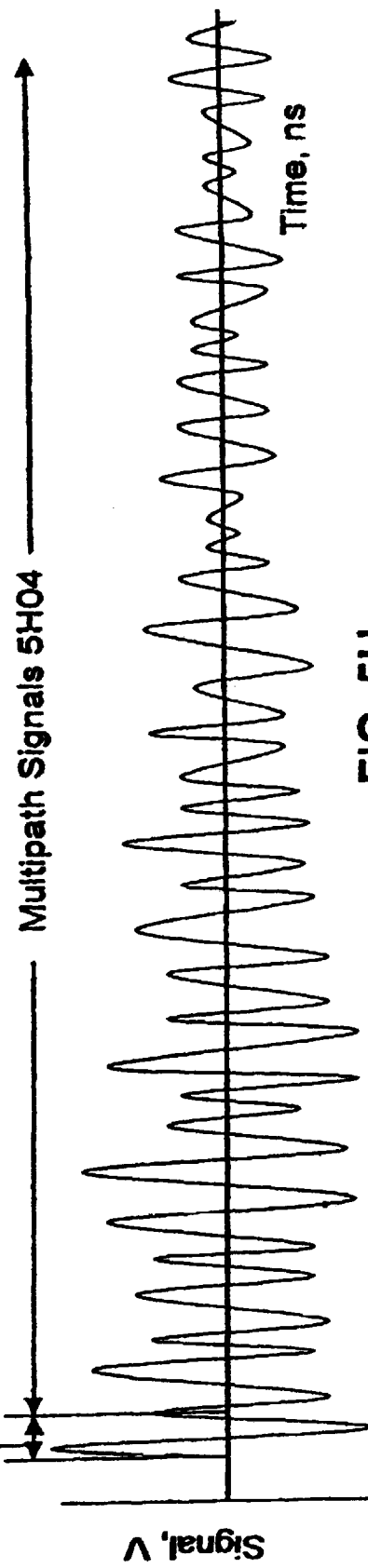
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIG. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications 09/045,929, filed Mar. 23, 1998, titled "Ultrawide-Band Position Determination System and Method", and 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned patents 4,641,317, 4,743, 906, 4,813,057 and 4,979,186 which are incorporated herein by reference, and commonly owned and co-pending application 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
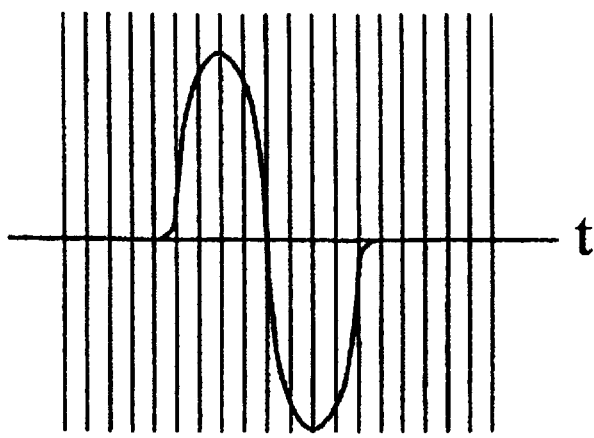
FIG. 8A illustrates a representative received pulse signal at the input to the correlator.
Figure 8B:
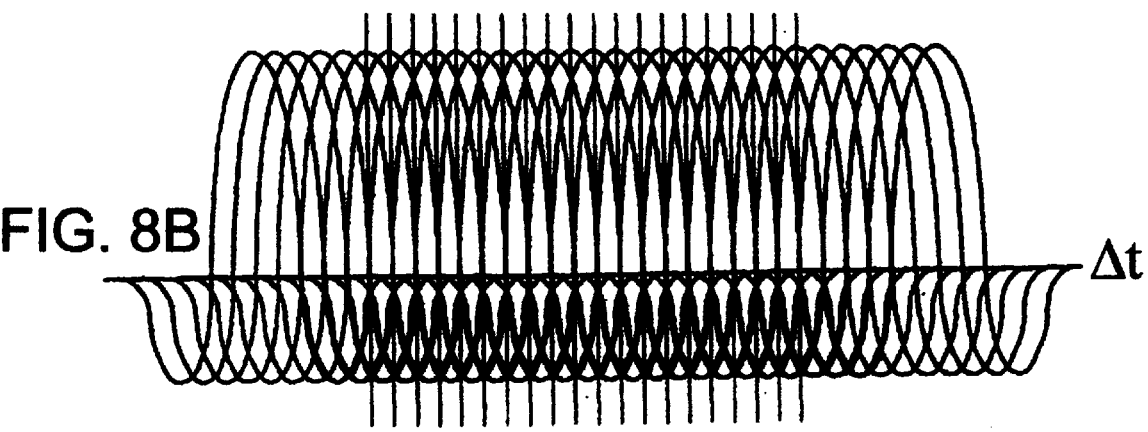
FIG. 8B illustrates a sequence of representative impulse signals in the correlation process.
Figure 8C:
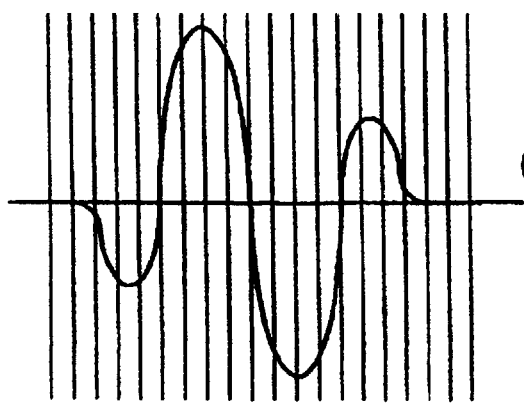
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

When utilized in a radio communication network, the characteristics of impulse radio significantly improve the state of the art.

DETAILED DESCRIPTION OF THE PREFERRED EMBODIMENT

Throughout this description, it should be kept in mind that discussions relating to transmitting or transmissions apply with equal veracity to reception of electromagnetic energy or signals. In order to avoid prolixity, the present description will focus primarily on transmission characteristics of antennas, with the proviso that it is understood that reception of energy or signals is also inherently described.

Figure 9:
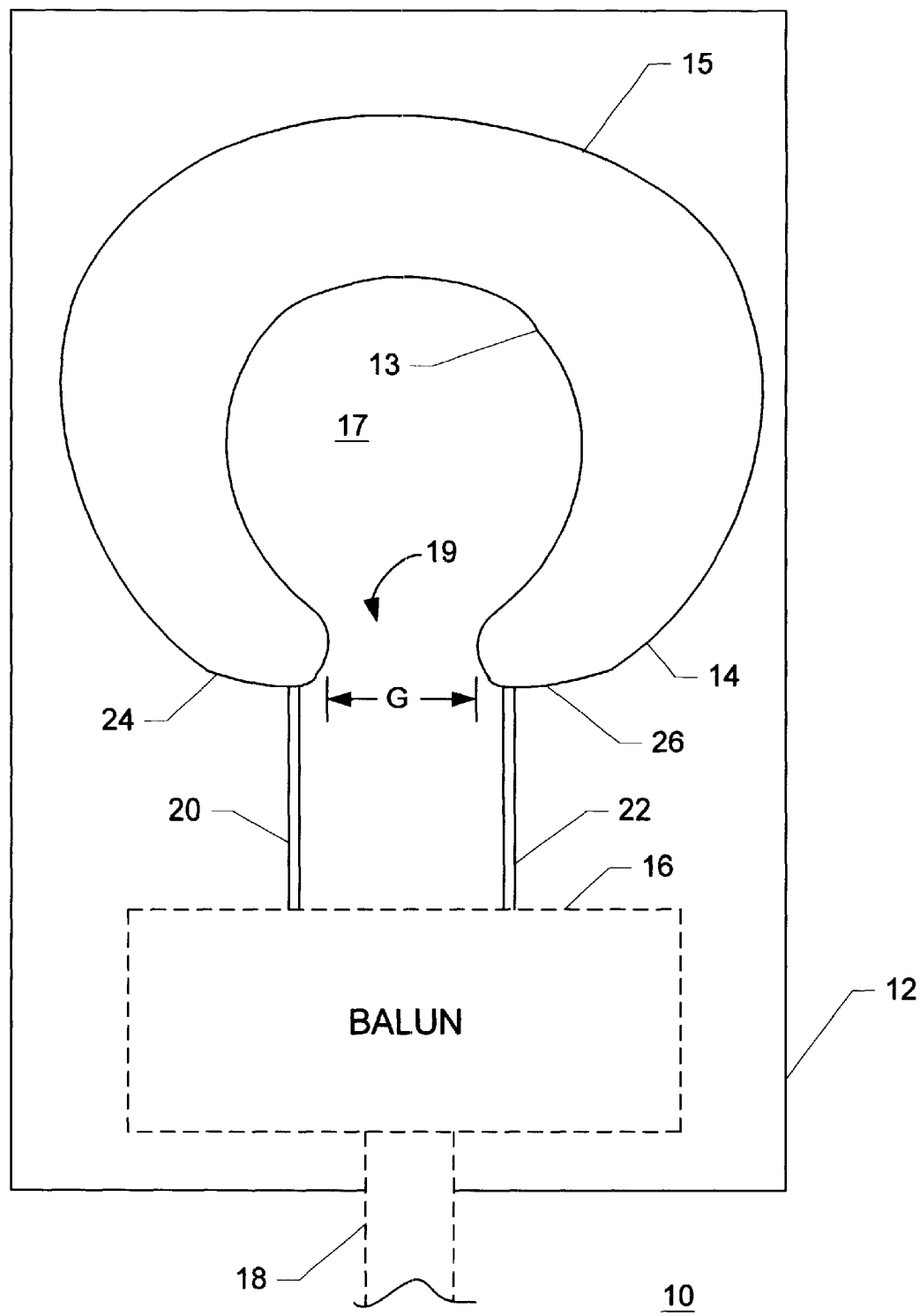
FIG. 9 is a top plan view of a first embodiment of an antenna configured according to the present invention.

FIG. 9 is a top plan view of a first embodiment of an antenna configured according to the present invention. In FIG. 9, an antenna apparatus 10 includes a dielectric substrate 12 and a transceiver element 14. Transceiver element 14 is bounded by a first edge 13 and a second edge 15. First edge 13 and second edge 15 are substantially circular and concentric. Thus, first edge 13 substantially circumscribes a generally circular area 17 save for a gap 19 having a gap width G intermediate a first end 24 of transceiver element 14 and a second end 26 of transceiver element 14.

First edge 13 establishes a first edge length and second edge 15 establishes a second edge length longer than the first edge length established by first edge 13. The shorter edge length established by first edge 13 is related to the shortest wavelength of signals efficiently handled by transceiver element 14. The longer edge length established by second edge 15 is related to the longest wavelength of signals efficiently handled by transceiver element 14. Preferably the circumferential length of transceiver element measured generally along a line substantially midway between first edge 13 and second edge 15 is approximately equal to one-half the center wavelength of the range of signals efficiently handled by transceiver element 14.

Transmission conveyor 18 is preferably embodied a differential feed structure from supporting circuitry in a host device (not shown in FIG. 9) using antenna apparatus 10. Transmission conveyor 18 may be embodied in a coaxial cable, and may be embodied in other transmission structures such as, by way of illustration and not by way of limitation, coaxial cable, stripline, microstrip, twin lead, twisted pair fiber optic cable, wave guide or other transmission line, or a connector or coupler that enables connection to a transmission line.

In an alternate embodiment of the present invention using transmission conveyor 18 embodied, for example, in a coaxial cable, a balun element 16 receives signals from a host device (not shown in FIG. 9) via transmission conveyor 18 and provides signals thus received to transceiver element 14 via feed leads 20, 22. A balun device is connected with an unbalanced signal source on one side (e.g., a coaxial cable that is grounded at one lead and carries a signal on another lead) and presents a balanced output at another side (e.g., two signal-carrying output elements). Balun 16 and transmission conveyor 18 are illustrated in broken lines in FIG. 9 to emphasize that employment of a single transmission conveyor 18 to balun 16 is an alternate embodiment of the present invention.

Feed leads 20, 22 cooperate to apply a signal representative of a signal carried by transmission conveyor 18 to transceiver element 14 via one of feed lead 20, 22; the other of feed lead 20, 22 applies a signal to transceiver element 14 that is a negative representation of a signal carried by transmission conveyor 18. Such a differential feed arrangement is preferably provided directly from a host device (not shown in FIG. 9), but may be provided by balun 16 in cooperation with transmission conveyor 18 configured, for example, as a coaxial cable. Such a differential signal feeding arrangement causes transceiver element 14 to be driven by alternate signals from feed leads 20, 22 to set up a radiating field of electromagnetic energy that is akin to the electromagnetic field of a loop antenna. The structure of antenna apparatus 10 incorporating a planar substrate 12 and planar transceiver element 14 configures antenna apparatus 10 advantageously for compact applications. One exemplary such application is use of antenna apparatus 10 in a PCM-CIA (Personal Computer Memory Card International Association) accessories for use with lap top computers for establishing wireless communications.

Figure 10:
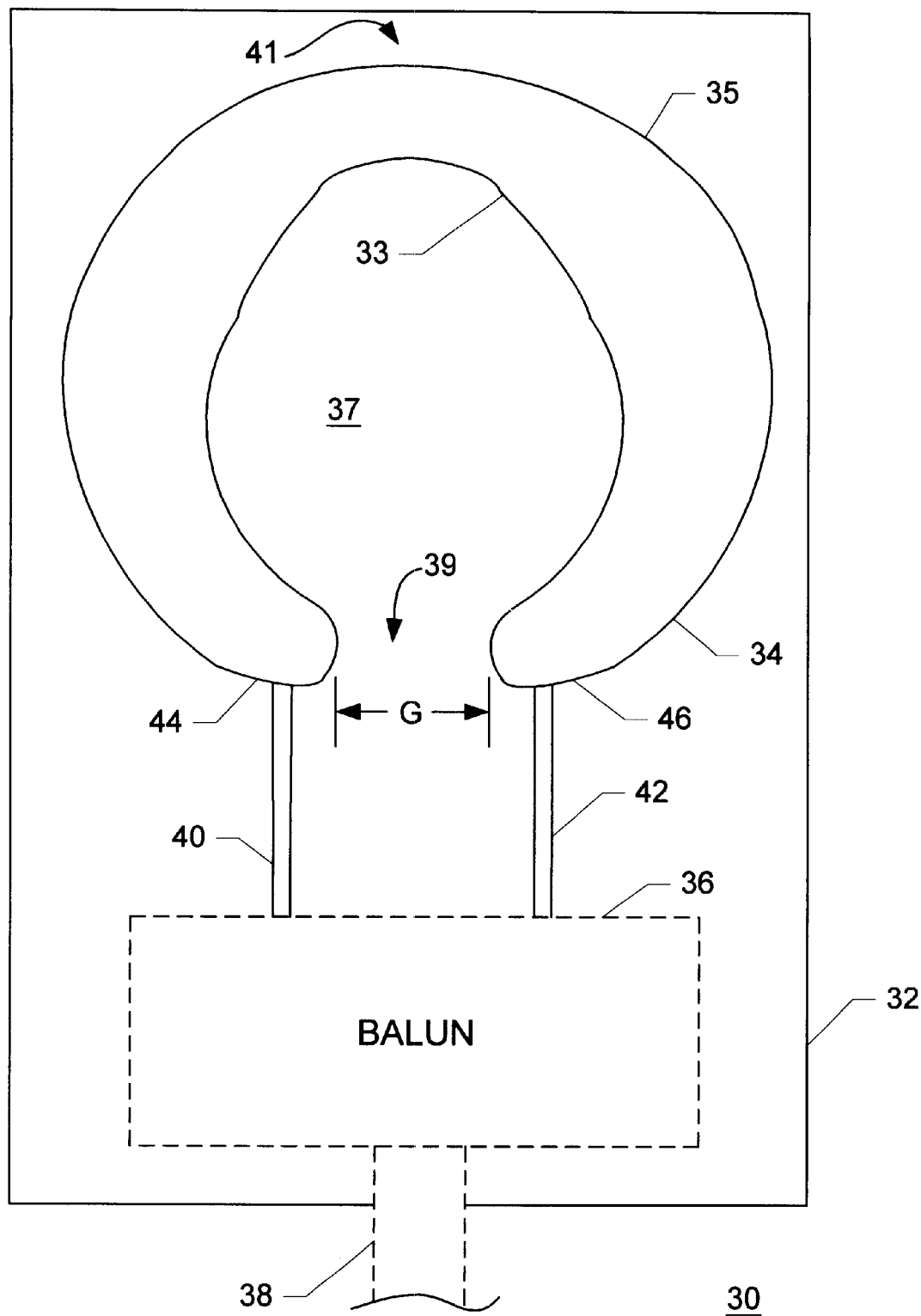
FIG. 10 is a top plan view of a second embodiment of an antenna configured according to the present invention.

FIG. 10 is a top plan view of a second embodiment of an antenna configured according to the present invention. In FIG. 10, an antenna apparatus 30 includes a dielectric substrate 32 and a transceiver element 34. Transceiver element 34 is bounded by a first edge 33 and a second edge 35. First edge 33 and second edge 35 are generally circular and concentric except for a deviant region 41. Thus, first edge 33 substantially circumscribes a generally "teardrop-shaped" area 37 save for a gap 39 having a gap width G intermediate a first end 44 of transceiver element 34 and a second end 46 of transceiver element 34. Deviant region 41 is distal from gap 39.

First edge 33 establishes a first edge length and second edge 35 establishes a second edge length longer than the first edge length established by first edge 33. The shorter edge length established by first edge 33 is related to the shortest wavelength of signals efficiently handled by transceiver element 34. The longer edge length established by second edge 35 is related to the longest wavelength of signals efficiently handled by transceiver element 34. Preferably the circumferential length of transceiver element measured generally along a line substantially midway between first edge 33 and second edge 35 is approximately equal to one-half the center wavelength of the range of signals efficiently handled by transceiver element 34.

Transmission conveyor 38 is preferably embodied in a differential feed structure from supporting circuitry in a host device (not shown in FIG. 10) using antenna apparatus 30. Transmission conveyor 38 may be embodied in a coaxial cable, and may be embodied in other transmission structures such as, by way of illustration and not by way of limitation, coaxial cable, stripline, microstrip, twin lead, twisted pair fiber optic cable, wave guide or other transmission line, or a connector or coupler that enables connection to a transmission line.

In an alternate embodiment of the present invention using transmission conveyor 38 embodied, for example, in a coaxial cable, a balun element 36 receives signals from a host device (not shown in FIG. 10) via transmission conveyor 38 and provides signals thus received to transceiver element 34 via feed leads 40, 42. A balun device is connected with an unbalanced signal source on one side (e.g., a coaxial cable that is grounded at one lead and carries a signal on another lead) and presents a balanced output at another side (e.g., two signal-carrying output elements). Balun element 36 and transmission conveyor 38 are illustrated in broken lines in FIG. 10 to emphasize that employment of a single transmission conveyor 38 to balun 36 is an alternate embodiment of the present invention.

Feed leads 40, 42 and balun element 36 cooperate to apply a signal representative of a signal carried by transmission conveyor 38 to transceiver element 34 via one of feed lead 40, 42; the other of feed lead 40, 42 applies a signal to transceiver element 34 that is a negative representation of a signal carried by transmission conveyor 38. Such a differential feed arrangement is preferably provided directly from a host device (not shown in FIG. 10), but may be provided by balun 36 in cooperation with transmission conveyor 38 configured, for example, as a coaxial cable. Such a differential signal feeding arrangement causes transceiver element 34 to be driven by alternate signals from feed leads 40, 42 to set up a radiating field of electromagnetic energy that is akin to the electromagnetic field of a loop antenna. The structure of antenna apparatus 30 incorporating a planar substrate 32 and planar transceiver element 34 configures antenna apparatus 30 advantageously for compact applications. One exemplary such application is use of antenna apparatus 10 in a PCMCIA (Personal Computer Memory Card International Association) accessories for use with lap top computers for establishing wireless communications.

Figure 11:
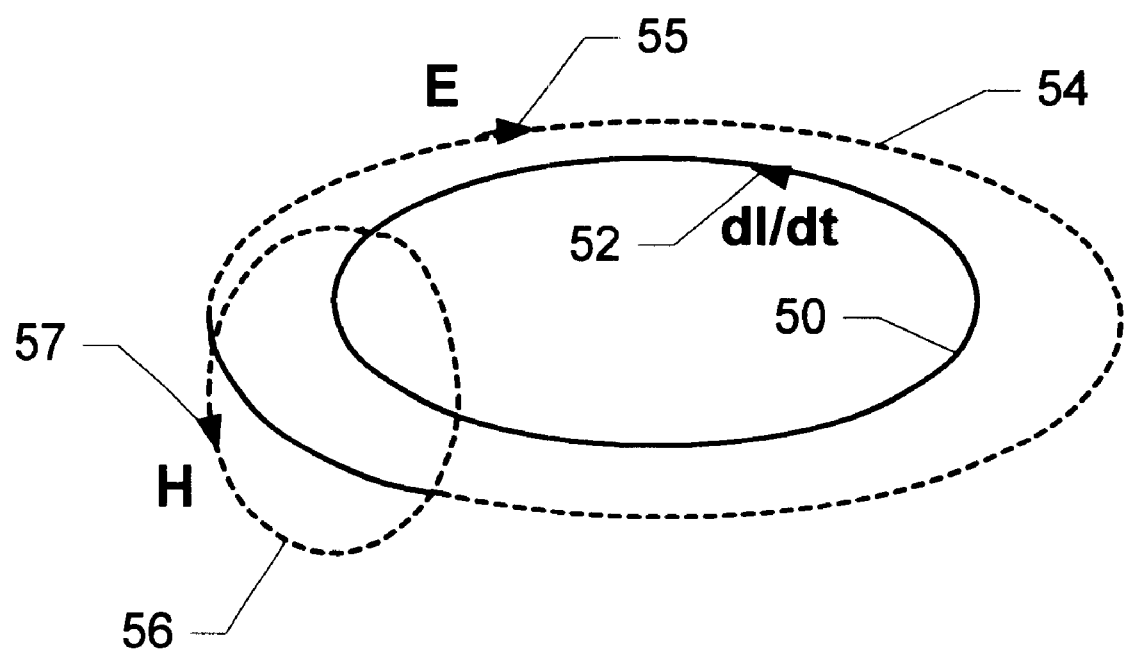
FIG. 11 illustrates a horizontally oriented current-carrying conductor with its associated electric radiation field and magnetic radiation field.

FIG. 11 illustrates a horizontally oriented current-carrying conductor with its associated electric radiation field and magnetic radiation field. In FIG. 11, an electrical conductor 50 is oriented horizontally and carries an electrical current that changes with respect to time at a rate dI/dt while flowing in a direction indicated by an arrow 52 to create an electric radiation field 54. Electric radiation field 54 is created in a horizontal orientation; a magnetic radiation field 56 is also created in a vertical orientation. Electric radiation field 54 has a radiation field strength E and is vectorally oriented as indicated by an arrow 55 in FIG. 11. Magnetic radiation field 56 has a radiation field strength H and is vectorally oriented as indicated by an arrow 57 in FIG. 11. Antenna apparatus 10 (FIG. 9) and antenna apparatus 30 (FIG. 10) will create electric radiation fields and magnetic radiation fields similar to electric radiation field 54 and magnetic radiation field 56 illustrated in FIG. 11 when incorporated in a PCMCIA-type application. In a PCMCI application, antenna apparatuses 10, 30 will be oriented in a plane substantially parallel with a plane containing a keyboard for an associated lap top computer. Thus, the radiation pattern of an electric radiation field E established by antenna apparatus 10, 30 in such an application is substantially oriented as electric radiation field 54 in FIG. 11. Such a horizontal orientation is beneficial in circumstances commonly encountered by a lap top computer engaged in wireless communication operations. For example, a horizontally oriented electric radiation field is useful in propagating past vertically oriented metal studs of the sort commonly employed for supporting walls in commercial buildings in certain frequency ranges. Also, many cellular telephones radiate with a vertically oriented electric radiation field, and a horizontally oriented electric radiation field in such an environment provides some polarization immunity to aid in avoiding interference among signals.

Figure 12:
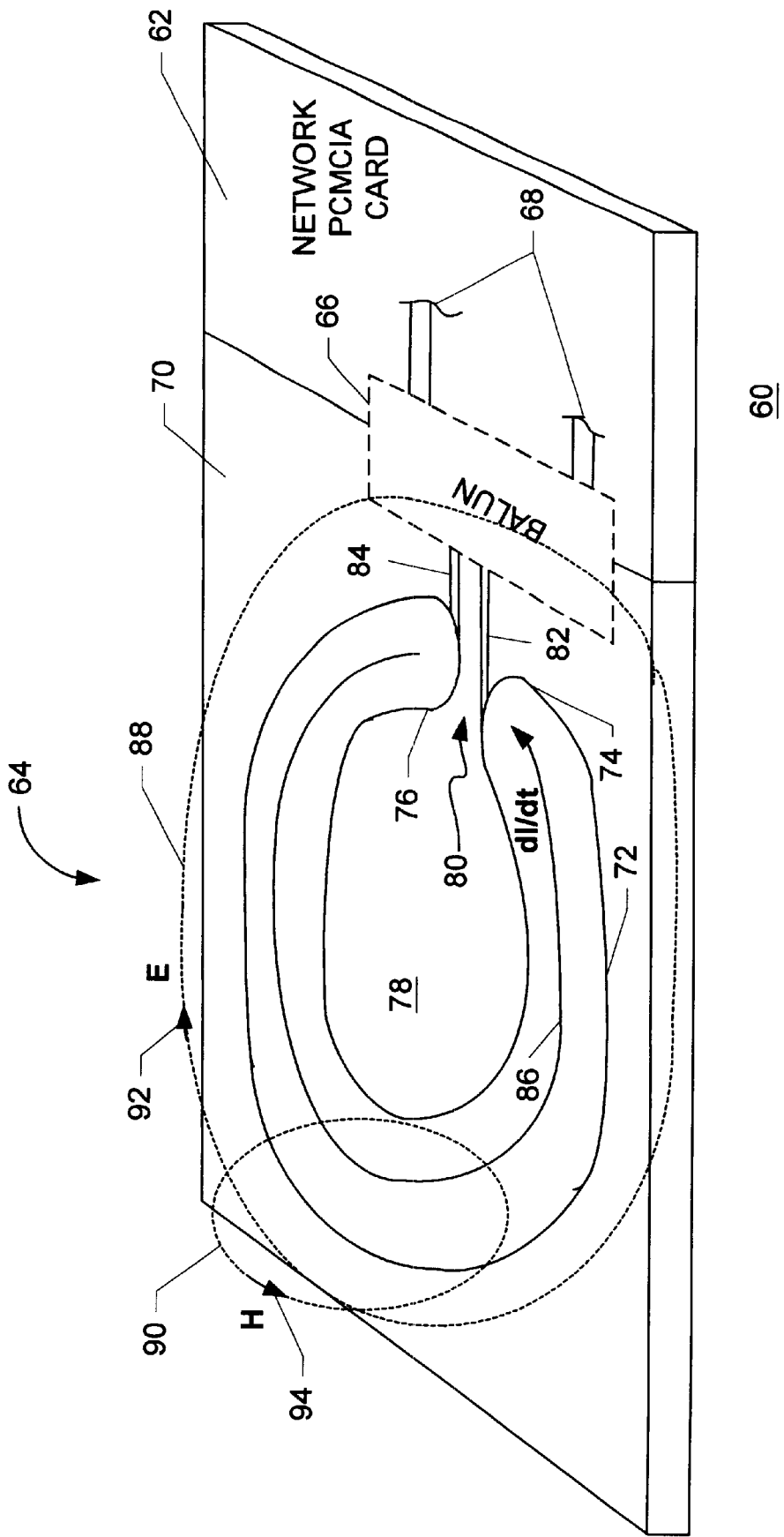
FIG. 12 is a perspective view of an antenna configured according to the present invention employed in a network PCMCIA card.

FIG. 12 is a perspective view of an antenna configured according to the present invention employed in a network PCMCIA card. In FIG. 12, a wireless communication apparatus 60 configured for use with a lap top computer designed to accommodate a PCMCIA device includes a network PCMCIA card 62 and an antenna element 64 in an affixed or integral relation with PCMCIA card 62. Electrical connections 68 provide a differential feed to couple PCMCIA card 62 with a transceiver element 72 via feed leads 82, 84. Electrical connections 68 are preferably embodied in circuit traces embodied in network PCMCIA card 62, but may be embodied in other transmission structures such as, by way of illustration and not by way of limitation, coaxial cable, stripline, microstrip, twin lead, twisted pair fiber optic cable, wave guide or other transmission line, or a connector or coupler that enables connection to a transmission line.

Antenna element 64 includes a dielectric substrate 70 upon which transceiver element 72 is affixed. Transceiver element 72 is arranged generally in a bight or loop having a first end 74 and a second end 76 and substantially enclosing a central area 78. First end 74 and second end 76 are spaced apart to establish a gap 80 between first end 74 and second 76. A first feed lead 82 couples first end 74 with network PCMCIA card 62. A second feed lead 84 couples second end 76 with network PCMCIA card 62.

Coupling between network PCMCIA card 62 and transceiver element 72 is preferably embodied in a differential feed structure, represented in FIG. 12 in electrical connections 68 and feed leads 82, 84. In an alternate embodiment of the present invention using coupling between network PCMCIA card 62 and transceiver element 72 embodied, for example, in a coaxial cable, a balun element 66 receives signals from network PCMCIA card 62 and provides signals thus received to transceiver element 72 via feed leads 82, 84. A balun device is connected with an unbalanced signal source on one side (e.g., a coaxial cable that is grounded at one lead and carries a signal on another lead) and presents a balanced output at another side (e.g., two signal-carrying output elements). Balun element 66 is represented in broken lines in FIG. 12 to emphasize that employment of balun element 66 is an alternate embodiment of the present invention.

Feed leads 82, 84 cooperate to apply a signal representative of a signal carried by signal conveying conductors among electrical connections 68 to transceiver element 72 via one of feed lead 82, 84; the other of feed lead 82, 84 applies a signal to transceiver element 72 that is a negative representation of a signal carried by signal conveying conductors among electrical connections 68. Such a differential feed arrangement is preferably provided directly from network PCMCIA card 62, but may be provided by balun 66 in cooperation with a coaxial cable connection or a similar unbalanced signal connection. Such a differential signal feeding arrangement causes transceiver element 72 to be driven by alternate signals from feed leads 82, 84 to set up a radiating field of electromagnetic energy that is akin to the electromagnetic field of a loop antenna. The structure of wireless communication apparatus 60 that includes antenna element 64 incorporating a planar substrate 70 and planar transceiver element 72 configures wireless communication apparatus 60 advantageously for compact applications. One exemplary such application is use of wireless communication apparatus 60 with lap top computers for establishing wireless communications.

Antenna element 64 is oriented horizontally and carries an electrical current that changes with respect to time at a rate dI/dt while flowing in a direction indicated by an arrow 86 to create an electric radiation field 88. Electric radiation field 88 is created in a horizontal orientation; a magnetic radiation field 90 is also created in a vertical orientation. Electric radiation field 88 has a radiation field strength E and is vectorally oriented as indicated by an arrow 92 in FIG. 12. Magnetic radiation field 90 has a radiation field strength H and is vectorally oriented as indicated by an arrow 94 in FIG. 12. Wireless communication apparatus 60 will create electric radiation fields and magnetic radiation fields similar to electric radiation field 88 and magnetic radiation field 90 illustrated in FIG. 12 when incorporated in a PCMCIA-type application oriented in a plane substantially parallel with a plane containing a keyboard for an associated lap top computer. Thus, the radiation pattern of the electrical radiation field 88 established by wireless communication apparatus 60 in such an application with a lap top computer is substantially oriented as illustrated in FIG. 12. Such a horizontal orientation is beneficial in circumstances commonly encountered by a lap top computer engaged in wireless communication operations. For example, a horizontally oriented electric radiation field is useful in propagating past vertically oriented metal studs of the sort commonly employed for supporting walls in commercial buildings.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for conveying electromagnetic energy intermediate a host device and a medium substantially adjacent to the apparatus; the apparatus comprising:
   (a) a transceiving structure for transmitting said energy to said medium and receiving said energy from said medium;
   (b) a transmission structure for conveying signals representing said energy to said host device or from said host device; and
   (c) a feed structure coupling said transceiving structure with said transmission structure; said transceiving structure including a substantially planar metal layer arrayed upon a dielectric substrate; said metal layer being bounded by a first edge and a second edge; said first edge and said second edge cooperating to form a bight having a first arm and a second arm establishing a metal-free area intermediate said first arm and said second arm; said first arm presenting a first terminal locus and said second arm presenting a second terminal locus; said feed structure being coupled with said first and second terminal loci to effect said coupling; the apparatus effecting said transfer of electromagnetic energy in signals having a range of frequencies intermediate a high-limit frequency and a low-limit frequency; said first edge extending a first path length intermediate said first terminal locus and said second terminal locus; said second edge extending a second path length intermediate said first terminal locus and said second terminal locus; said first path length being related to a first wavelength of one frequency of said high-limit frequency and said low-limit frequency; said second path length being related to a second wavelength of the other frequency of said high-limit frequency and said low-limit frequency than said one frequency.

2. The apparatus for conveying electromagnetic energy intermediate a host device and a medium substantially adjacent to the apparatus as recited in claim 1 wherein said first and second terminal loci are separated by a first distance on a first separation line; and wherein said metal-free area extends a second distance greater than said first distance at a widest dimension on a second separation line; said first separation line and said second separation line being generally parallel.

3. The apparatus for conveying electromagnetic energy intermediate a host device and a medium substantially adjacent to the apparatus as recited in claim 2 wherein said first distance and said second distance are generally symmetrically arranged about a substantially perpendicular bisector common to said first separation line and said second separation line.

4. An antenna for effecting transfer of electromagnetic signals intermediate a host device and a medium substantially adjacent to the antenna; said electromagnetic signals having a range of frequencies intermediate a high-limit frequency and a low-limit frequency; the antenna comprising:
   (a) a transceiving structure for transmitting said signals to said medium and receiving said signals from said medium; and
   (b) a feed structure coupled with said transceiving structure for transferring said signals intermediate said transceiving structure and said host device; said transceiving structure including a substantially planar metal layer affixed to a dielectric substrate; said metal layer being bounded by a first edge and a second edge; said first edge and said second edge cooperating to form a bight having a first arm and a second arm establishing a metal-free area intermediate said first arm and said second arm; said first arm presenting a first terminal locus and said second arm presenting a second terminal locus; said first edge extending a first path length intermediate said first terminal locus and said second terminal locus; said second edge extending a second path length intermediate said first terminal locus and said second terminal locus; said first path length being related to a first wavelength of one frequency of said high-limit frequency and said low-limit frequency; said second path length being related to a second wavelength of the other frequency of said high-limit frequency and said low-limit frequency than said one frequency; said feed structure being coupled with said first and second terminal loci to effect said coupling.

5. The antenna for effecting transfer of electromagnetic energy intermediate a host device and a medium substantially adjacent to the antenna as recited in claim 4 wherein said first and second terminal loci are separated by a first distance on a first separation line; and wherein said metal-free area extends a second distance greater than said first distance at a widest dimension on a second separation line; said first separation line and said second separation line being generally parallel.

6. The antenna for effecting transfer of electromagnetic energy intermediate a host device and a medium substantially adjacent to the antenna as recited in claim 5 wherein said first distance and said second distance are generally symmetrically arranged about a substantially perpendicular bisector common to said first separation line and said second separation line.

7. An antenna for effecting transfer of electromagnetic signals intermediate a host impulse radio device and a medium substantially adjacent to the antenna; said electromagnetic signals having a range of frequencies intermediate a high-limit frequency and a low-limit frequency; the antenna comprising:
   (a) a transceiving structure for transmitting said signals to said medium and receiving said signals from said medium; and
   (b) a feed structure coupled with said transceiving structure for transferring saids signals intermediate said transceiving structure and said host device; said transceiving structure including a substantially planar metal layer affixed to a dielectric substrate; said metal layer being bounded by a first edge and a second edge; said first edge and said second edge cooperating to form a bight having a first arm and a second arm establishing a metal-free area intermediate said first arm and said second arm; said first arm presenting a first terminal locus and said second arm presenting a second terminal locus; said first edge extending a first path length intermediate said first terminal locus and said second terminal locus; said second edge extending a second path length intermediate said first terminal locus and said second terminal locus; said first path length being related to a first wavelength of one frequency of said high-limit frequency and said low-limit frequency; said second path length being related to a second wavelength of the other frequency of said high-limit frequency and said low-limit frequency than said one frequency; said feed structure being coupled with said first and second terminal loci to effect said coupling.

8. The antenna for effecting transfer of electromagnetic energy intermediate a host device and a medium substantially adjacent to the antenna as recited in claim 7 wherein said first and second terminal loci are separated by a first distance on a first separation line; and wherein said metal-free area extends a second distance greater than said first distance at a widest dimension on a second separation line; said first separation line and said second separation line being generally parallel.

9. The antenna for effecting transfer of electromagnetic energy intermediate a host device and a medium substantially adjacent to the antenna as recited in claim 8 wherein said first distance and said second distance are generally symmetrically arranged about a substantially perpendicular bisector common to said first separation line and said second separation line.

* * * * *